(12) United States Patent
Park et al.

(10) Patent No.: US 8,129,942 B2
(45) Date of Patent: Mar. 6, 2012

(54) CONTACTLESS CHARGING METHOD FOR CHARGING BATTERY

(75) Inventors: Dong-Young Park, Seoul (KR); Sung-Wook Moon, Seoul (KR); Sung-Wook Choi, Anyang-si (KR); Gwang-Hee Gwon, Anyang-si (KR); Sub Han, Yongin-si (KR); Jung-Bum Kim, Anyang-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 958 days.

(21) Appl. No.: 11/997,401

(22) PCT Filed: Jul. 10, 2006

(86) PCT No.: PCT/KR2006/002695
§ 371 (c)(1),
(2), (4) Date: May 22, 2008

(87) PCT Pub. No.: WO2007/015599
PCT Pub. Date: Feb. 8, 2007

(65) Prior Publication Data
US 2008/0211455 A1 Sep. 4, 2008

(30) Foreign Application Priority Data
Jul. 30, 2005 (KR) .................. 10-2005-0069962

(51) Int. Cl.
*H02J 7/14* (2006.01)
(52) U.S. Cl. ........................ 320/108; 320/106
(58) Field of Classification Search .......... 320/108, 320/106
See application file for complete search history.

(56) References Cited

U.S. PATENT DOCUMENTS

| 2002/0089305 | A1* | 7/2002 | Park et al. .................. 320/108 |
| 2003/0210106 | A1 | 11/2003 | Cheng et al. |
| 2003/0214821 | A1* | 11/2003 | Giannopoulos et al. ... 363/21.02 |

FOREIGN PATENT DOCUMENTS

| GB | 2 314 470 A | 12/1997 |
| JP | 2002-209344 A | 7/2002 |

(Continued)

OTHER PUBLICATIONS

International Search Report, dated Oct. 11, 2006, issued in International Application No. PCT/KR2006/002695.

*Primary Examiner* — Samuel Berhanu
(74) *Attorney, Agent, or Firm* — Sherr & Vaughn, PLLC (57) ABSTRACT

A system, method and apparatus for contact-less charging of battery operated devices is presented. There is a host charger with a power converter and resonant tank circuit and a portable device where the battery is located, with a battery charging control IC. The method obviates the need for a voltage controller in each of both the host and the portable stages, thus decreasing complexity and increasing efficiency. The charging of the battery in the portable device is controlled by a charging controller therein, which is in continual electric communication with the host, whose output power the control IC dynamically monitors and controls. Two embodiments for the charging circuitry in the portable device are presented. In one embodiment component count is minimized but battery charging is not optimized when the battery voltage is very low. In the other embodiment charging efficiency is maximized regardless of the output voltage of the battery, but additional components are utilized.

6 Claims, 4 Drawing Sheets

FOREIGN PATENT DOCUMENTS

| | | |
|---|---|---|
| JP | 2002-315209 | 10/2002 |
| JP | 2004-513681 | 5/2004 |
| JP | 2004-328916 | 11/2004 |
| KR | 2000-0010733 A | 2/2000 |
| KR | 2002-0035242 A | 5/2002 |
| KR | 2002-0057468 A | 7/2002 |
| KR | 2002-0057469 A | 7/2002 |
| KR | 10-363439 B1 | 12/2002 |
| KR | 10-2004-0028312 A | 4/2004 |
| KR | 10-0428713 B1 | 4/2004 |
| KR | 10-2005-0005480 A | 1/2005 |
| KR | 10-0505484 B1 | 8/2005 |
| WO | WO 02/07596 | 1/2002 |
| WO | WO-03098773 | 11/2003 |

\* cited by examiner

CONTACTLESS CHARGING METHOD FOR CHARGING BATTERY

CROSS-REFERENCE TO RELATED APPLICATIONS

This application is a national stage application under 35 U.S.C. 371 based on and claiming the benefit of International Application Serial No. PCT/KR2006/002695 filed on Jul. 10, 2006 and the benefit of priority from Korean Application No. 10-2005-69962 filed on Jul. 30, 2005 the entire contents of each of which are incorporated herein by reference.

TECHNICAL FIELD

The present invention relates to a charging device of a portable electronic device, and more particularly to a contactless charger system using inductive coupling.

BACKGROUND ART

A rechargeable secondary battery is mounted to a portable electronic device such as a mobile communication terminal and PDA. To charge the secondary battery, a separate charging device for supplying an electric energy to the battery of a portable electronic device using an AC line power is required. Generally, separate contact terminals are respectively provided to outsides of the charging device and the battery so that the charging device and the battery may be electrically connected with each other by connecting both contact terminals.

However, if a contact terminal is exposed out as mentioned above, an appearance is deteriorated and the contact terminal is contaminated due to external impurities to easily cause an inferior contact status. In addition, if the battery is short-circuited or exposed to moisture due to the carelessness of a user, the charged energy may be easily lost.

In order to solve the problem of the contact-type charging method, a wireless charging system that allows charging in a contactless manner between the charging device and the battery has been proposed.

Korean Laid-open Publication No. 2002-57468, Korean Laid-open Publication No. 2002-57469, Korean Patent Registration No. 363,439, Korean Patent Registration No. 428,713, Korean Laid-open Publication No. 2002-35242, Korean Utility Model Registration No. 217,303, GB 2,314,470, and US Publication Serial No. 2003/0,210,106 disclose a contactless charger system that charges a battery without a contact terminal using inductive coupling between a primary coil of a charging body and a secondary coil of a battery pack.

In addition, Korean Laid-open Publication No. 2004-87037 discloses a contactless chargeable battery pack including a control circuit for accumulating information such as a use time and a charging capacity by measuring voltage and current of a battery, and then correcting a charging/discharging capacity of the battery based on the accumulated information. In particular, the control circuit further includes a compensating circuit for compensating a charging voltage and a battery temperature based on a charging voltage detected from the battery and a temperature of the battery detected by a temperature sensor.

However, Korean Laid-open Publication No. 2004-87037 does not disclose a power supplier for feeding back charging status information (e.g., charging current, charging voltage, etc.) and generating a charging power corresponding to the charging status information, or a contactless charger system using such a power supplier.

DISCLOSURE OF INVENTION

Technical Problem

The present invention is designed in consideration of the above problems, and therefore it is an object of the invention to provide a contactless charger system using inductive coupling between a primary coil and a secondary coil, which may feed back status information of a battery in wireless and then generate a charging power most suitable for a status of the battery.

In addition, another object of the present invention is to solve an interference of a power signal and a communication signal between a primary charging unit (or, a charging body) and a secondary charging unit (or, a battery pack).

In addition, still another object of the present invention is to supply a charging power after the primary coil and the secondary coil are magnetically completely coupled so as to prevent an unnecessary power consumption.

In addition, further another object of the present invention is to classify a charging status of a battery into a standby mode, a charging mode and a full-charged mode, and then check a mode status of the battery to supply a charging power most suitable for the mode.

The above and other objects and advantages of the present invention will be described below in detail, and they would be understood through embodiments of the present invention. In addition, the objects and advantages of the present invention may be realized using means and combinations in the appended claims.

Technical Solution

In order to accomplish the above object, in a first aspect of the present invention, there is provided a charging power supply device contactlessly coupled with a battery device including a secondary coil for induced coupling, a wireless transmitting module for wirelessly transmitting data, a charging control circuit for controlling a charging status of a battery, and a rechargeable battery.

The charging power supply device according to the first aspect of the present invention includes a primary coil for inducing a charging power to the secondary coil; a wireless receiving module for receiving charging status information from the wireless transmitting module; and means for driving the primary coil so that a power signal between the primary and secondary coils and a communication signal between the wireless transmitting and receiving modules are not overlapped in aspect of time.

In addition, in a second aspect of the present invention, there is also provided a charging device for receiving a power contactlessly from a charging power supply device that generates an AC voltage pulse having a frequency larger than an AC line frequency using an AC line voltage, and charging a rechargeable battery using the power.

This charging device includes a secondary coil magnetically coupled with a primary coil of the charging power supply device to generate an induced electromotive force pulse corresponding to the AC voltage pulse; a charging control circuit for generating a constant voltage and a constant current used for charging the battery on the basis of the induced electromotive force pulse; and a feedback control means for checking a falling edge of the induced electromotive force pulse, and then wirelessly feeding back a feedback response signal including charging status information of the battery to the charging power supply device in case a falling is detected.

In addition, the charging device of the present invention further includes a monitoring circuit for monitoring a charging status of the battery to generate charging status information, and then storing the charging status information to a memory; a memory for storing the charging status information and battery specification information; and a wireless transmitting module for generating a feedback response signal based on the charging status information, and wirelessly transmitting the feedback response signal to the charging power supply device.

In a third aspect of the present invention, there is provided a battery device for contactlessly receiving a charging power from a power supply device that generates a pulse width modulation signal having a frequency larger than an AC line frequency using an AC line power.

This battery device includes a rechargeable battery; a secondary coil magnetically coupled with a primary coil of the power supply device to generate an induced electromotive force pulse corresponding to the pulse width modulation signal; a charging control circuit for generating a constant voltage and a constant current used for charging the battery on the basis of the induced electromotive force, and charging the battery using the constant voltage and the constant current; a falling detector for detecting a falling edge of the induced electromotive force pulse; a memory for storing charging status information of the battery and battery specification information; a monitoring circuit for monitoring a charging status of the battery to generate charging status information, and storing the charging status information to the memory; a wireless transmitting module for modulating the charging status information to generate a feedback response signal, and wirelessly transmitting the feedback response signal to the power supply device; and a feedback controller for reading the charging status information from the memory and transmitting the charging status information to the wireless transmitting module in case the falling edge is detected.

In a fourth aspect of the present invention, there is provided a method for charging a battery in a contactless charger system that includes a primary charging unit having a primary coil and a wireless receiving module, a secondary charging unit having a wireless transmitting module and a secondary coil magnetically coupled with the primary coil, and a battery for receiving a charging voltage from the second charging unit.

This method includes (A) applying a power pulse train having a pulse width ($W_1$) to the primary coil to emit out a corresponding magnetic field; (B) wirelessly receiving from the secondary charging unit a charging start signal confirming that the primary coil and the secondary coil are magnetically coupled; (C) generating a charging power strain having a pulse width ($W_2$) at least greater than the pulse width ($W_1$) according to the charging start signal, and applying the charging power pulse train to the primary coil to generate a corresponding induced electromotive force pulse to the secondary coil; (D) charging the battery using the induced electromotive force pulse; (E) feeding back the charging status information of the battery from the secondary charging unit; and (F) controlling a pulse width of the charging power pulse based on the charging status information. Accordingly, the wireless feedback signal from the secondary charging unit is synchronized with a falling edge of the induced electromotive force pulse.

In addition, the step (B) also includes generating an induced electromotive force pulse from the secondary coil as the primary coil and the secondary coil are magnetically coupled; checking a falling edge of the induced electromotive pulse and reading the charging status information from the memory; determining a current status as an initial charging stage in case the charging status information is not recorded in the memory, and then generating an initial charging signal; and transmitting the initial charging signal to the wireless receiving module of the primary charging unit via the wireless transmitting module.

The step (A) also includes rectifying an AC line voltage into a DC voltage; generating an AC voltage having a frequency larger than an AC line frequency using the rectified DC; modulating a pulse width of the AC voltage to generate a power pulse train having a pulse width ($W_1$); and applying the power pulse train to the primary coil.

The step (D) also includes rectifying the induced electromotive force (or, AC voltage) into a DC voltage; generating a constant voltage and a constant current of a predetermined level, which is to be charged to the battery using the rectified DC voltage; and charging the battery in a constant current mode until a battery voltage reaches a predetermined level, and charging the battery in a constant voltage mode by controlling an amount of a charging current in case the battery voltage reaches the level.

The step (E) also includes checking a falling edge of the induced electromotive force pulse induced from the secondary coil; reading the charging status information from the memory in case a falling edge is checked; and generating a feedback response signal based on the charging status information and transmitting the feedback response signal to the wireless receiving module of the first charging unit through the wireless transmitting unit.

The step (F) also includes analyzing the charging status information to determine whether the battery is completely charged; and controlling a pulse width of the power pulse applied to the primary coil in correspondence to the charging status, in case the battery is not completely charged.

In a fifth aspect of the present invention, there is also provided a contactless charger system including a primary charging unit having a primary coil and a wireless receiving module, a secondary charging unit having a wireless transmitting module and a secondary coil magnetically coupled with the primary coil, and a battery for receiving a charging voltage from the second charging unit, wherein the primary charging unit includes means for generating an AC power pulse having a frequency larger than an AC line frequency as an AC line power is applied, and then applying the AC power pulse to the primary coil to induce a high frequency AC power pulse to the secondary coil, wherein the secondary charging unit includes means for transmitting charging status information of the battery to the primary charging unit by using an unused time between pulses of the AC voltage pulse induced by the secondary coil. Thus, a power signal between the primary and secondary coils and a communication signal between the wireless transmitting and receiving modules are not overlapped in aspect of time.

Preferably, the transmitting means detects a falling edge of the induced electromotive force pulse and transmits the charging status information of the battery together with detection of the falling edge.

In addition, the inducing means of the primary charging unit preferably includes means for generating an AC voltage having a frequency larger than an AC line frequency based on a DC voltage obtained by rectifying the AC line power; and means for generating a pulse width modulation signal using the AC voltage having a frequency larger than an AC line frequency.

Also preferably, the primary charging unit further includes means for analyzing the charging status information of the battery and controlling the pulse width.

Preferably, the second charging unit includes means for detecting a falling edge of the induced electromotive force pulse generated from the secondary coil; means for extracting the charging status information of the battery according to the detection of the falling edge, and generating a feedback response signal to be transmitted to the wireless receiving module of the primary charging unit using the charging status information; means for rectifying the induced electromotive force generated from the secondary coil into a DC voltage; means for generating a constant voltage and a constant current to be supplied to the battery using the rectified DC voltage; means for detecting a charging voltage and a charging current of the battery; and means for storing the charging voltage and the charging current.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
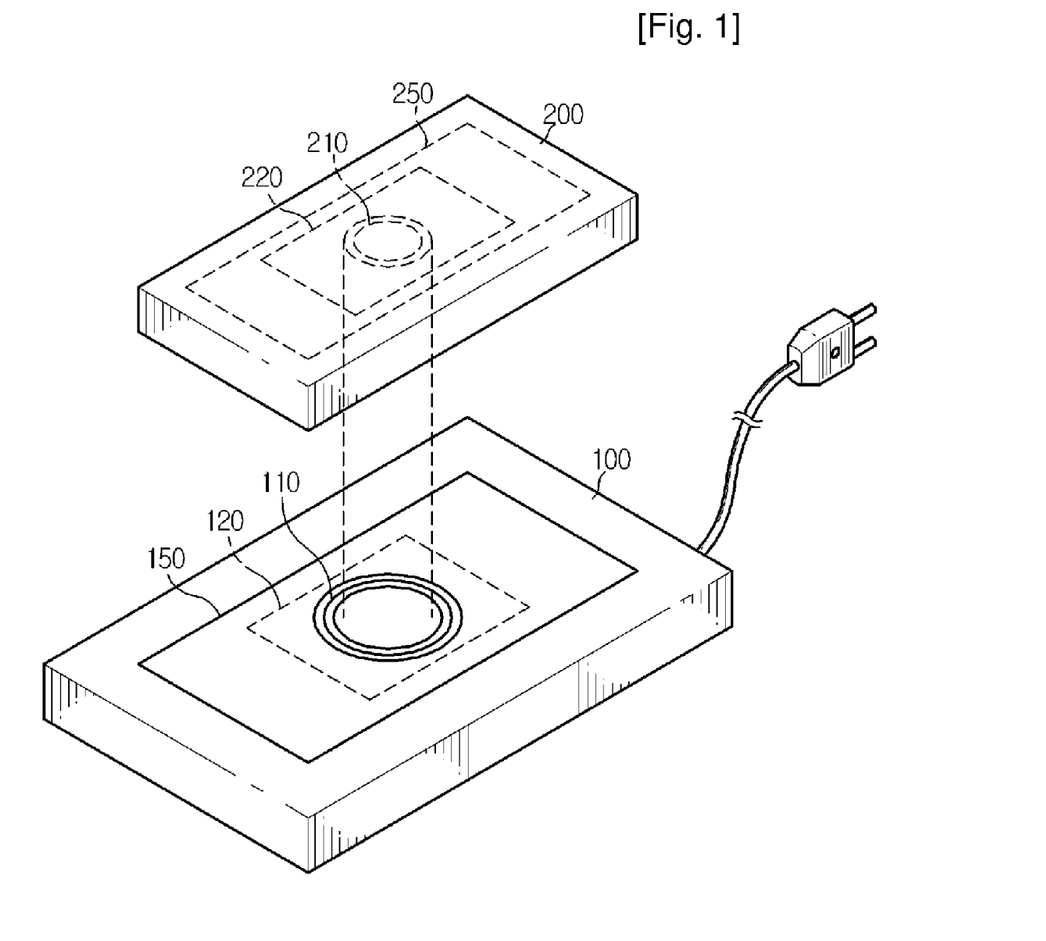
FIG. 1 is a schematic perspective view showing a contactless charger system according to a preferred embodiment of the present invention.

FIG. 1 is a schematic perspective view showing a contactless charger system according to a preferred embodiment of the present invention.

As shown in FIG. 1, the contactless charger system of the present invention includes a charging body 100 for generating a charging power to be supplied to a battery with the use of an external power, and a battery device 200 for receiving the charging power from the charging body 100 without any contact and charges a battery (not shown) therein using the charging power.

The battery device 200 may be a portable electronic device having a battery or a battery pack including a battery therein. Preferably, the portable electronic device may be a cellular phone, PDA, MP3 player and so on. The battery included in the battery device 200 is a rechargeable battery cell, including a lithium ion battery and a lithium polymer battery.

The charging body 100 receives an electric energy from an external power source and generates a charging power to be supplied to the battery device 200. The charging body 100 preferably has a pad shape so that the battery device 200 may be easily placed thereon. In addition, the external power supplied to the charging body 100 is preferably an AC line power for home use (e.g., 60 Hz, 220V/110V), but other DC power may also be used.

The charging body 100 and the battery device 200 respectively include a primary coil 110 and a secondary 210, and antennas 120, 220, which are corresponding to each other.

The primary and secondary coils 110, 210 are magnetically coupled with each other due to inductive coupling. Thus, as the secondary coil is juxtaposed on the primary coil, the magnetic field generated by the primary coil induces a current in the secondary coil. In addition, the primary and secondary coils 110, 210 are respectively surrounded by the antennas 120, 220.

In addition, the charging body 100 includes a charging power supply circuit 150 (see FIG. 2) for driving the primary coil 110 to generate a magnetic field, and the battery device 200 includes a charging circuit 250 (see FIG. 2) for charging a battery using an induced electromotive force induced by the secondary coil 210.

Figure 2:
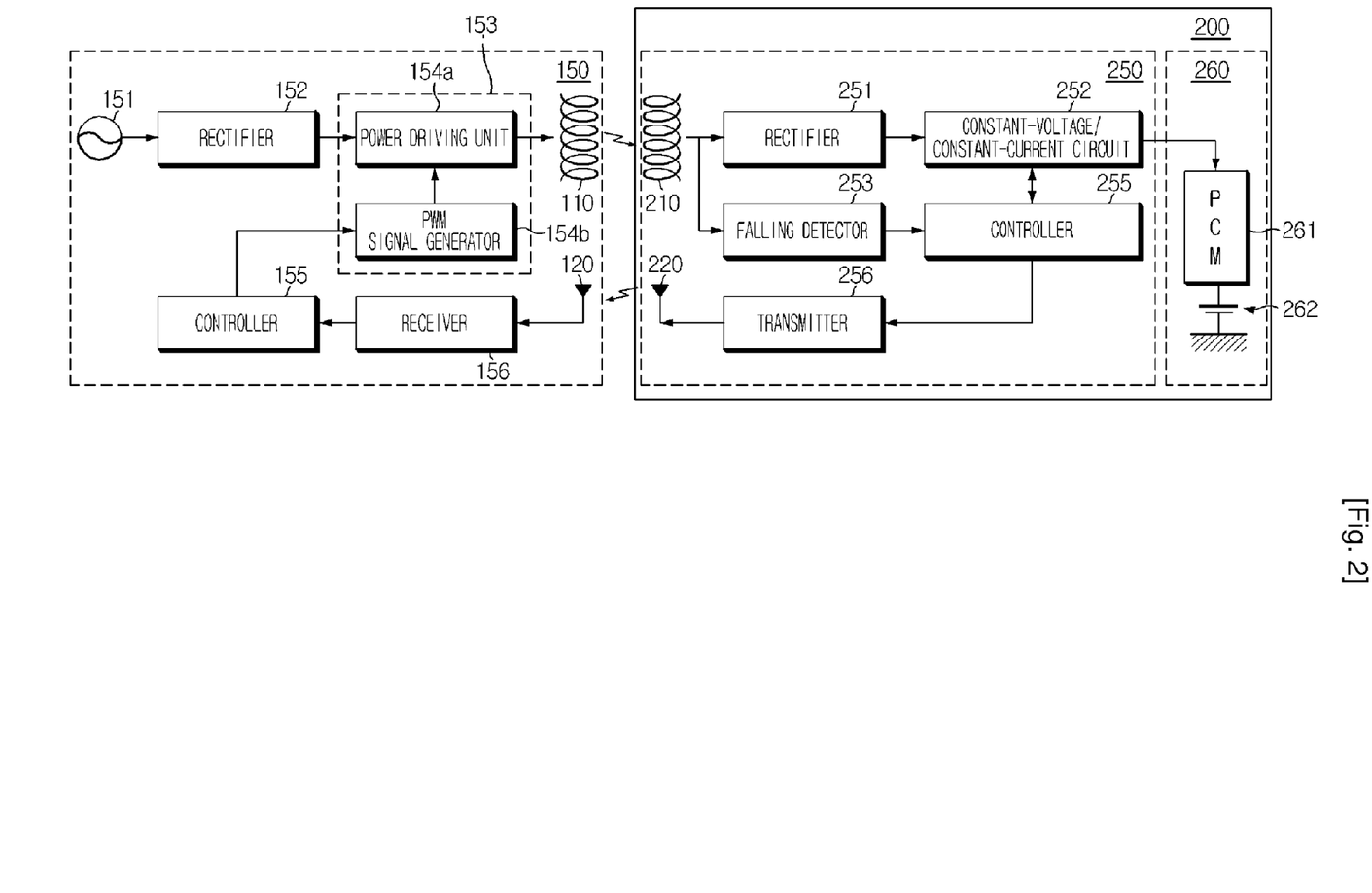
FIG. 2 is a block diagram showing inner configuration of the contactless charger system according to the preferred embodiment of the present invention.

Hereinafter, the charging power supply circuit 150 and the charging circuit 250 will be described in detail with reference to FIG. 2.

The charging power supply circuit 150 included in the charging body 100 includes a primary coil 110, a rectifier 152, a driving circuit 153, a controller 155, and a wireless receiving module 120, 156.

The rectifier 152 rectifies an AC power from the AC line power source 151 into a DC power, and then transfers it to the driving circuit 153. The driving circuit 153 generates a high frequency AC voltage pulse having a frequency larger than an AC line frequency using the DC voltage rectified by the rectifier 152, and applies it to the primary coil 110 to generate a magnetic field.

Figure 3:
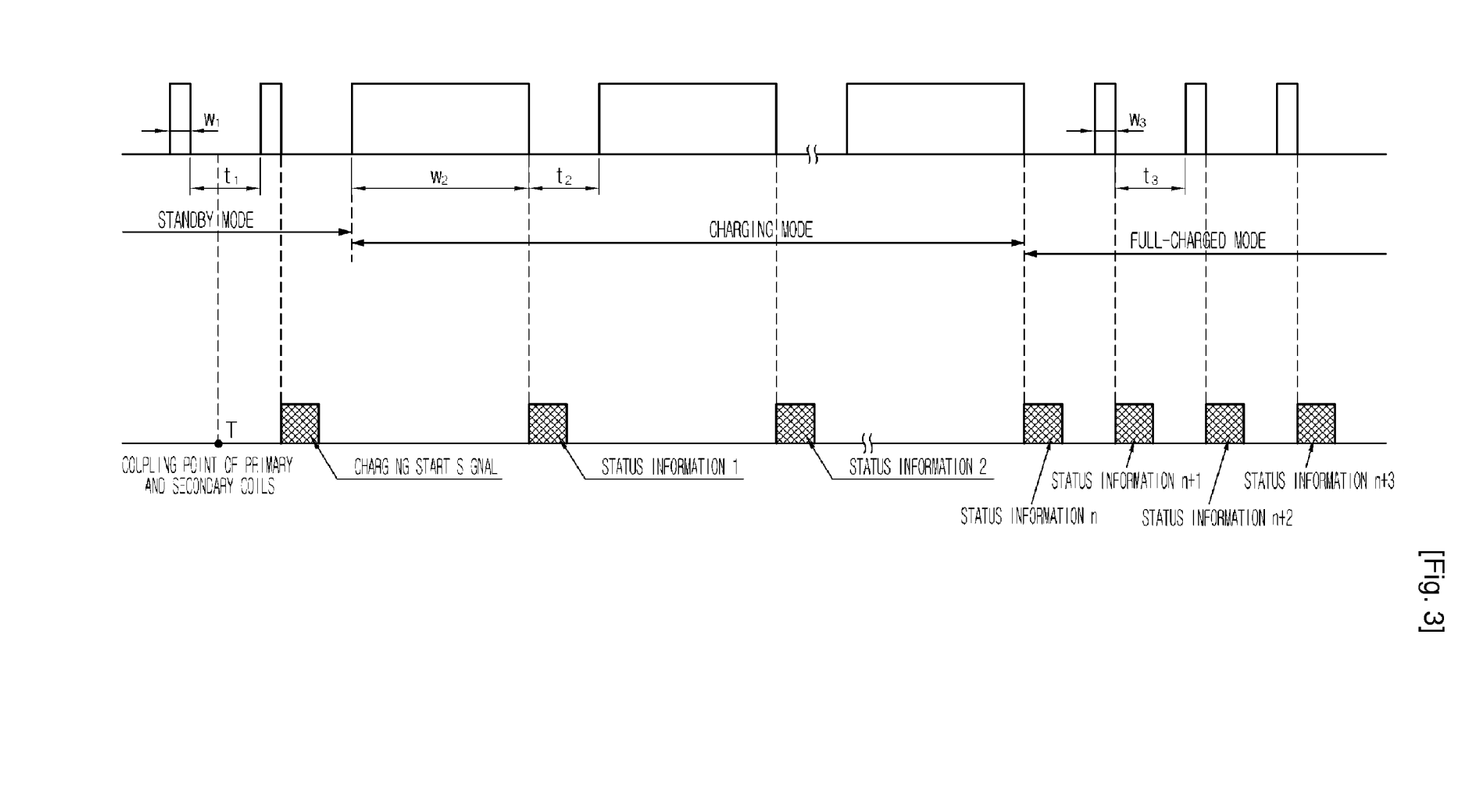
FIG. 3 is a timing chart illustrating a time-divisional arrangement of a power signal and a communication signal from a charging start point to a completely charged point.

The driving circuit 153 also includes a PWM (Pulse Width Modulation) signal generator 154b and a power driving unit 154a. The power driving unit 154a includes a high frequency oscillation circuit for converting an AC voltage of a certain level to oscillate a high frequency AC voltage having a frequency larger than an AC line frequency, and a drive circuit for applying a high frequency AC voltage pulse with a modulated pulse width to the primary coil 110 to drive the primary coil 110. The PWM signal generator 154b modulates a pulse width of the high frequency AC voltage. Thus, a signal output through an output end of the driving unit 153 becomes a high frequency AC voltage pulse. This high frequency AC voltage pulse is a pulse train as shown in FIG. 3. This pulse train is controlled by the controller 155. The driving circuit 153 employed in the present invention may adopt SMPS (Switching Mode Power Supply) as an example, but other equivalent means may also be used if it may give the same function and action.

The controller 155 controls a pulse width of the high frequency AC voltage pulse whose pulse width is modulated, based on charging status information of a battery that is fed back via wireless transmitting/receiving modules 156, 120, 220, 256. In particular, in case a response signal fed back from the charging circuit 250 is a charging start signal, the controller 155 switches a driving mode of the primary coil 110 from a standby mode to a charging mode as shown in FIG. 3. In addition, if the charging status information fed back from the charging circuit 250 is analyzed to determine that the battery is completely charged, the driving mode of the primary coil is shifted from a charging mode to a full-charged mode as shown in FIG. 3. In case there is no response signal fed back from the charging circuit 250, the controller 155 keeps the driving mode of the primary coil 110 in a standby mode.

As mentioned above, the controller 155 of the charging power supply circuit 150 shifts a driving mode of the primary coil 110 among the standby mode, the charging mode and the full-charged mode according to a response signal from the battery device 200 and its presence.

The wireless receiving module 120, 156 includes an antenna 120 for receiving a feedback response signal transmitted from the wireless transmitting module 220, 256 of the charging circuit 250, and a receiver 156 such as a demodulator for demodulating the feedback response signal to restore the charging status information of the battery.

The charging power supply circuit 150 of the present invention may further include an overvoltage filter circuit for protecting the circuit against an overvoltage, or a constant voltage circuit for keeping the DC voltage rectified by the rectifier to a voltage of a certain level. The overvoltage filter circuit is preferably arranged between the AC line power source 151 and the rectifier 152, and the constant voltage circuit is preferably arranged between the rectifier 152 and the driving circuit 153.

Now, the charging circuit 250 for receiving a power from the charging power supply circuit 150 and charging a battery 262 will be explained. This charging circuit 250 is mounted inside the battery device 200 together with the battery 262.

The charging circuit 250 includes a secondary coil 210, a rectifier 251, a constant voltage/constant current circuit 252, a falling detector 253, a controller 255, and a wireless transmitting module 220, 256.

The secondary coil 210 is magnetically coupled to the primary coil 110 to generate an induced electromotive force. Since a power signal applied to the primary coil 110 is a pulse width modulation signal as mentioned above, the induced electromotive force induced to the secondary coil 210 is also an AC voltage pulse train. In addition, the AC voltage pulse induced to the secondary coil 210 according to the driving mode of the primary coil 110 is also conforming to one of the standby mode, the charging mode and the full-charged mode, as shown in FIG. 3.

The rectifier 251 is connected to an output end of the secondary coil 210 to smooth the AC voltage pulse induced by the secondary coil 210 into DC of a certain level.

The constant voltage/constant current circuit 252 generates a constant voltage and a constant current to be charged to the battery using a DC voltage of a predetermined level. That is to say, a constant current mode is kept during an initial charging period of the battery, but, if the charging voltage of the battery is saturated, the mode is shifted into a constant voltage mode.

The falling detector 253 detects a time point when the AC voltage pulse induced by the secondary coil drops, namely a falling edge. This falling detection signal is input to the controller 255.

The controller 255 is a kind of microprocessor, which receives a monitoring signal such as a falling detection signal, a charging current, a charging voltage and so on, and controls the constant voltage/constant current circuit 252 and the wireless transmitting module 220, 256 based on the monitoring signal.

That is to say, the controller 255 checks a falling edge of pulses based on the falling detection signal input from the falling detector 253, and synchronizes a transmission time of the feedback response signal to be transmitted to the charging power supply device 150 with the pulse falling edge.

In addition, the controller 255 always monitors a charging current and a charging voltage of the battery and temporarily stores the monitoring values in an internal memory (not shown). The memory, not shown, stores battery specification information (product code, rate, and so on) as well as the battery charging status information such as the monitored charging current and voltage.

In addition, the controller 255 suitably selects and shifts a constant voltage mode and a constant current mode according to the charging status of the battery.

The wireless transmitting module includes an antenna 220 for sending a feedback response signal (e.g., a charging start signal or a charging status signal) to be transmitted to the charging power supply device 150, and a transmitter 256 for modulating a baseband signal such as the charging status information to generate a feedback response signal.

A protection circuit (e.g., PCM) 261 for preventing an overvoltage or an overcurrent from being applied to the battery is arranged between the constant voltage/constant current device 252 and the battery 262. The protection circuit 261 and the battery 262 configure a single battery unit 260.

Now, a charging status of the battery will be explained for each mode with reference to FIG. 3. Here, the charging power supply device or the charging device is defined as a primary charging unit, and the charging circuit or the battery device is defined as a secondary charging unit, for convenience.

If an external power such as the AC line power source 151 is applied to the primary charging unit, the controller 155 of the primary charging unit wakes up and controls the driving circuit 153 to drive the primary coil 110.

That is to say, in case no response is received from the secondary charging unit, the controller 155 determines it as a standby mode, and then controls the driving circuit 153 to apply a standby mode power pulse train having a width of w and a period of $t_1$ to the primary coil 110. Accordingly, the primary coil 110 generates a magnetic field corresponding to the standby mode power pulse train, and emits it to outside. This emission of magnetic field is continued until the charging start signal shown in FIG. 3 is received in the wireless receiving module 120, 156 of the primary charging unit.

As the battery device 200 is placed on the charging body 100 as shown in FIG. 1 to magnetically couple the primary coil 110 and the secondary coil 210 with each other (T point in FIG. 3), a standby mode power pulse train having a width of w and a period of $t_1$ is also induced to an output end of the secondary coil 210 by means of the magnetic field generated from the primary coil 110. This power pulse train has too weak power to charge the battery, so it is used as a driving power of an internal circuit of the secondary charging unit (particularly, a driving power of a microprocessor). That is to say, the power pulse in the standby mode is emitted out and consumed before the primary coil and the secondary coil are coupled, and it is used as a driving power for waking up the microprocessor if the primary coil and the secondary coil are coupled.

As mentioned above, if an induced electromotive force is induced to the secondary charging unit, the falling detector 253 of the secondary charging unit checks a drop point of the induction pulse (or, a falling edge). At this time, if the falling detector 253 detects a drop time of pulse, the falling detection signal is input to the controller 255 of the secondary charging unit, and the controller 255 feeds back a charging start signal as shown in FIG. 3 to the primary charging unit via the wireless transmitting unit 220, 256 as a response. That is to say, in more detail, as the falling detection signal is input, the controller inquires the internal memory to determine whether the charging status information exists. At this time, if the charging status information does not exist in the memory, it is determined that a current status is in a standby mode, and thus a charging start signal for indicating the primary charging unit to be shifted into a charging mode is transmitted as a response.

The controller 155 of the primary charging unit, to which the charging start signal is fed back from the secondary charging unit, shifts the standby mode into the charging mode as shown in FIG. 3. That is to say, the controller 155 controls the driving circuit 153 to drive a charging mode power pulse train having a width of $w_2$ and a period of $t_2$. Here, $w_2$ is at least greater than $w_1$.

Accordingly, the charging mode power pulse train having a width of $w_2$ and a period of $t_2$ is induced to an output end of the secondary coil 210, and this power pulse train is rectified and charged to the battery 262. Known constant current mode and constant voltage mode are used for charging the battery.

Meanwhile, as the charging mode power pulse train having a width of w and a period of $t_2$ is induced to the output end of the secondary coil 210, the falling detector 253 checks a falling edge of each pulse. At this time, of a falling edge of pulse is detected, the controller reads the charging status information (e.g., a charging voltage or a charging current) already monitored and stored in the memory. The read charging status information is fed back to the primary charging unit via the charging transmitting module as a response.

The controller 155 of the primary charging unit, to which the charging status information is fed back from the secondary charging unit, analyzes the charging status information and then controls the driving circuit 153 based on the analyzing result to control a pulse width of the power pulse applied to the primary coil 110.

At this time, if it is determined that the battery is already completely charged as a result of the analysis of the charging status information, the controller 155 of the primary charging unit shifts the charging mode into a full-charged mode as shown in FIG. 3.

That is to say, the driving circuit is controlled to drive a full-charged mode power pulse train having a width of $w_3$ and a period of $t_3$. Here, $w_3$ is preferably smaller than $w_{12}$ but equal to or greater than $w_1$.

Also in the full-charged mode, the charging status information at the pulse falling edge is fed back to the primary charging unit from the secondary charging unit, and the controller of the primary charging unit analyzes this charging status information to determine whether to keep the full-charged mode or return to the charging mode.

As described above, in the present invention, the power signal (or, the power pulse train) transmitted between the primary coil and the secondary coil and the communication signal (or, the feedback response signal) transmitted between the wireless transmitting module and the wireless receiving module are time-divided so that they are not overlapped in aspect of time. That is to say, the communication signal is synchronized and transmitted at a falling edge of the power signal. Thus, it is possible to prevent interference, distortion or dilution of signals, which may be generated when the power signal and the communication signal are transmitted at the same time.

In addition, in the present invention, a standby mode and a full-charged mode are provided separately from the charging mode. Thus, it is possible to minimize an energy emitted out and consumed by the primary coil, thereby reducing a power consumption in comparison to a conventional contactless charging device.

Figure 4:
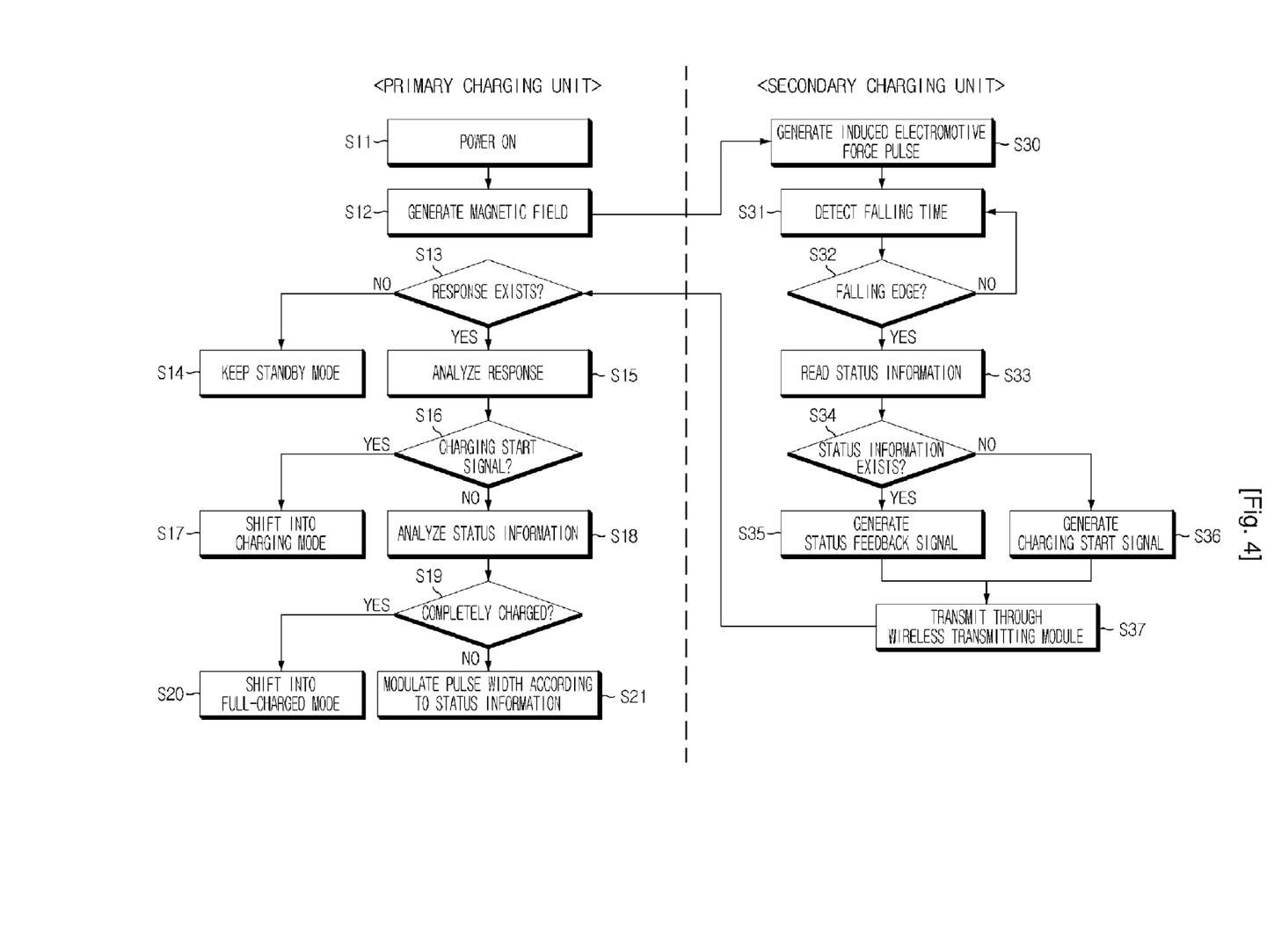
FIG. 4 is a flowchart illustrating a contactless charging method according to the present invention.

Hereinafter, an operation of the contactless charger system according to the present invention will be described with reference to FIGS. 3 and 4.

If an external power such as the AC line power source 151 is applied to the primary charging unit (S11), the controller 155 of the primary charging unit wakes up and drives the primary coil 110. That is to say, the standby mode power pulse (or, the pulse width modulation high frequency AC voltage) of FIG. 3 is applied to the primary coil 110, and the primary coil forms a magnetic field corresponding thereto and emits it out (S12).

An induced electromotive force pulse corresponding to the standby mode power pulse is generated at the output end of the secondary coil 210 due to the magnetic field (S30). This induced electromotive force pulse is too weak to charge the battery, so it is used as a driving power for driving a circuit in the secondary charging unit (particularly, a microprocessor). In addition, the falling detector 253 of the secondary charging unit checks a drop time of the standby mode power pulse to detect a falling edge (S31).

At this time, if the falling edge is detected, the controller 255 of the secondary charging unit searches the internal memory to read status information (particularly, charging status information) (S33). This status information includes the charging status information such as a charging voltage and a charging current, and battery specification information such as a product code and a rate.

If there is no charging status information in the memory in the step S33, the controller 255 determines that the current operating status is in a standby state and generates a charging start signal (S36), and then transmits it to the primary charging unit through the wireless transmitting module 210, 256 (S37).

Meanwhile, if the status information exists in the memory in the step S33, the status information is read from the memory, then a status feedback signal (or, a feedback response signal) is generated based on the status information, and then the status feedback signal is transmitted to the primary charging unit through the wireless transmitting module 210, 256 (S37).

Also, the controller 155 of the primary charging unit determines whether a response fed back from the secondary charging unit exists (S13), and then, if there is no response, the controller 155 determines that the primary coil and the secondary coil are not coupled and then keeps the existing standby mode (S14).

Meanwhile, in case there is a response fed back from the secondary charging unit, the corresponding response is analyzed to determine whether it is a charging start signal (S15, S16).

At this time, if it is determined as a charging start signal, the operating mode of the system is shifted from the standby mode to the charging mode (S17). Meanwhile, if the response is not a charging start signal, the status information is analyzed more precisely (S118).

If it is determined that the battery is completely charged as a result of analysis of the status information in the step S18, the operating mode of the system is shifted from the charging mode to the full-charged mode (S20).

Meanwhile, if the battery is not completely charged, a size of the charging power is controlled based on the charging status information included in the status information. That is to say, a pulse width of the high frequency AC voltage pulse applied to the primary coil is controlled (S21).

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

As described above, the present invention controls a charging power after feeding back status information of a battery, thereby capable of supplying a power more suitable for the secondary charging unit.

In addition, since the power signal and the communication signal transmitted/received between the primary and secondary charging units are synchronized not to be overlapped, it is possible to easily solve interference, distortion and dilution of signals.

In addition, since the operating mode of the system is designed to shift into a standby mode and a full-charged mode, which save power, in addition to a charging mode, a power may be reduced up to 95% in comparison to the conventional system.

The invention claimed is:

1. A contactless charging method for charging a battery in a contact charger system that includes a primary charging unit having a primary coil and a wireless receiving module, a secondary charging unit having a wireless transmitting module and a secondary coil magnetically coupled with the primary coil, and a battery for receiving a charging voltage from the secondary charging unit, the method comprising:

(A) applying a power pulse train having a pulse width (W1) to the primary coil to emit out a corresponding magnetic field;

(B) generating a train of an induced charging power pulse corresponding to the power pulse train with the pulse width (W1) as the primary coil and the secondary coil are magnetically coupled, wherein the train of the induced charging power pulse is a standby mode pulse;

(C) waking up an internal circuit of the secondary charging unit by using the standby mode pulse, checking a falling edge of the standby mode pulse, and reading previously stored charging status information of the battery when said failing edge is detected;

(D) when the charging status information does not exist, generating a charging start signal for an initial charging, and transmitting the charging start signal through the wireless transmitting module of the secondary charging unit to the wireless receiving module of the primary charging unit;

(E) generating a charging power pulse train having a pulse width (W2) at least greater than the pulse width (W1) according to the charging start signal, and applying the charging power pulse train to the primary coil to generate a train of the corresponding induced charging power pulse to the secondary coil, wherein the charging power pulse train is a charging mode pulse;

(F) charging the battery using the charging mode pulse;

(G) feeding back the charging status information of the battery from the secondary charging unit; and (H) checking falling edge of the charging mode pulse, and, when a falling edge of the charging mode pulse is detected, reading charging status information of the battery, then transmitting the charging status information to the primary charging unit, and controlling a pulse width of the charging mode pulse based on the transmitted charging status information of the battery, wherein:

when the battery is fully charged as a result of analysis of the charging status information of the battery in the step (H), a full-charged mode power pulse train having a pulse width (W3) is applied to the primary coil; and the pulse width (W3) is controlled to be smaller than the pulse width (W2) and equal to or greater than the pulse width (W1).

2. The contactless charging method of claim 1, wherein the pulse width ($W_3$) is equal to $W_1$.

3. The contactless charging method of claim 1, wherein the full-charged mode power pulse train is generated by means for modulating a pulse width of an AC voltage having a higher frequency than a commercial frequency.

4. The contactless charging method of claim 1, wherein the charging status information includes a charging voltage value or a charging current value of the battery.

5. The contactless charging method of claim 1, wherein the step (A) includes:

rectifying a common AC voltage into a DC voltage;

generating an AC voltage having a higher frequency than a commercial frequency using the rectified DC;

modulating a pulse width of the AC voltage to generate the power pulse train having the pulse width ($W_1$); and applying the power pulse train having the pulse width ($W_1$) to the primary coil.

6. The contactless charging method of claim 1, wherein the step (F) includes:

rectifying the charging mode pulse representing AC voltage into a DC voltage;

generating a constant voltage and a constant current of a predetermined level, which is to be charged to the battery, using the rectified DC voltage; and charging the battery in mode of the constant current until a battery voltage reaches a predetermined level, and then charging the battery in mode of the constant voltage by controlling an amount of a charging current.

* * * * *